United States Patent
Osako et al.

(10) Patent No.: US 7,654,222 B2
(45) Date of Patent: Feb. 2, 2010

(54) FLUIDIZED BED APPARATUS

(75) Inventors: Yoshifumi Osako, Osaka (JP);
Naochika Asai, Izumi (JP); Takashi Ueno, Kawachinagano (JP)

(73) Assignee: Fuji Paudal Company Limited, Osaka (JP)

( * ) Notice: Subject to any disclaimer, the term of this patent is extended or adjusted under 35 U.S.C. 154(b) by 639 days.

(21) Appl. No.: 11/609,974

(22) Filed: Dec. 13, 2006

(65) Prior Publication Data
US 2007/0137561 A1    Jun. 21, 2007

(30) Foreign Application Priority Data
Dec. 15, 2005    (JP) .............................. 2005-362305

(51) Int. Cl.
*B01J 8/18* (2006.01)
*B05C 5/00* (2006.01)
*B05C 19/00* (2006.01)
*B01D 46/04* (2006.01)

(52) U.S. Cl. ...................... 118/303; 118/308; 118/309; 118/323; 118/63; 55/294; 95/280

(58) Field of Classification Search ................. 118/303, 118/308, 309, 58, 62, 19, 24, DIG. 5, 323, 118/302, 63, 64, 70, 29; 427/213, 421.1, 427/180, 185; 34/168, 565, 579, 583; 239/336, 239/424, 424.5; 422/139; 425/22; 55/294, 55/295, 299, 302; 95/279, 280
See application file for complete search history.

(56) References Cited

U.S. PATENT DOCUMENTS

| | | | | |
|---|---|---|---|---|
| 3,411,480 A | * | 11/1968 | Grass, Jr. et al. | 118/24 |
| 4,097,254 A | * | 6/1978 | Noland | 55/294 |
| 6,648,969 B2 | * | 11/2003 | Hirono et al. | 118/309 |

* cited by examiner

*Primary Examiner*—Yewebdar T Tadesse
(74) *Attorney, Agent, or Firm*—Vedder Price P.C.

(57) ABSTRACT

A fluidized bed apparatus includes a fluidizing container, a porous plate, a lower spray nozzle, a bag filter, an upper spray nozzle, a backwash nozzle, and a backwash nozzle elevator. The fluidizing container is formed in an inverted truncated conical cylindrical shape. The porous plate is provided so as to block a lower opening of the fluidizing container. The lower spray nozzle jets out air into the fluidizing container via the porous plate. The bag filter is provided at an upper opening of the fluidizing container. The upper spray nozzle sprays spray liquid downward. The backwash nozzle sweeps away powder particulates adhered to the bag filter by jetting out air from the outside of the bag filter toward the inside and is moved up and down by the backwash nozzle elevator. The fluidizing container may be vibrated by a vibrator.

15 Claims, 6 Drawing Sheets

FLUIDIZED BED APPARATUS

BACKGROUND OF THE INVENTION

1. Field of the Invention

The present Invention relates to a fluidized bed apparatus used for a granulation or coating operation of powder particulates (powder and/or particulates). In particular, it relates to a fluidized bed apparatus that allows an infinitesimal loading amount.

2. Description of the Related Art

In the field of pharmaceutical research, new synthetics in an early stage of development of medicines and the like are produced in units of grams or milligrams. These minute amounts of synthetics are not suitable for pharmaceutical research carried out with 300 g to 1000 g-load laboratory-scale fluidized bed reactors currently placed on the market since the apparatuses are too large. If an experimental evaluation is intended by charging these minute amounts of synthetics into a 300 to 1000 g-load laboratory-scale fluidized bed reactor currently placed on the market, the following problems will occur.

First, the loading amount is too small to fluidize sample powder. Second, the sample powder adheres to a container wall or a bag filter since the container is too large, so that fluidized powder will be remarkably small in amount. Third, the sample powder has an excessively large space during fluidization since the container is too large, so that adhesion of a spray liquid (such as a binder or coating liquid) sprayed from a spray nozzle to the sample powder will be remarkably reduced. Fourth, spray nozzles equipped with these laboratory-scale reactors cannot realize fluidization appropriate for granulation or coating operation since the quantity of air is too large. In addition, since the quantity of the liquid is too large relative to the minute loading amount, aggregate clusters will be instantaneously produced. Under the above conditions, currently, there is no fluidized bed apparatus that can be operated with a load in units of grams.

Moreover, the minute amounts of synthetics have been experimentally evaluated manually using mortars, beakers, and other instruments in the current situation. Accordingly, the operational conditions are unstable and problems such as human error and deficient reproducibility will occur. For these problems, comparability for next-stage laboratory-scale reactors cannot be obtained. Furthermore, currently, it is said that a few hundred billion yen is required for top-level new drug development of anticancer drugs, gene therapy agents, and the like, and it is an extremely important task to meet demand for a few gram-load fluidized bed apparatus that can satisfy conditions, such as operation with a minute loading amount, reduction of screening time, and collection of quantitative data.

On the other hand, in the field of preparation research carried out after the pharmaceutical research as in the above, it is said that new synthetics delivered to the preparation research are generally 100 g, however, it is also said that these are approximately 50 g in some cases. These minute amounts of synthetics are not suitable for pharmaceutical research carried out with 300 g to 1000 g-load laboratory-scale fluidized bed reactors currently placed on the market since the apparatuses are too large. If an experimental evaluation is intended by charging these minute amounts of synthetics into a 300 to 1000 g-load laboratory-scale fluidized bed reactor currently placed on the market, the following problems will occur.

First, the loading amount is too small to fluidize sample powder. Second, the sample powder adheres to a container wall or a bag filter since the container is too large, so that fluidized powder is remarkably small in amount. Third, the sample powder has an excessively large space during fluidization since the container is too large, so that adhesion of spray liquid (such as a binder or coating liquid) sprayed from a spray nozzle to the sample powder is remarkably reduced. Fourth, spray nozzles equipped with these laboratory-scale reactors cannot realize fluidization appropriate for granulation or coating operation since the quantity of air is too large. In addition, since the quantity of liquid is too large relative to the minute loading amount, aggregate clusters are instantaneously produced. Under the above conditions, currently, there is no fluidized bed apparatus that can be operated for usage in the preparation research including prescription research and dosage form research with a load of tens of grams.

Moreover, in the field of solid preparation of granules, fine granules, capsules, granules for tablets, the majority of drug preparation units are fluidized bed apparatuses. The reasons for this include that a single fluidized bed apparatus can carry out mixing, granulation, drying, and coating. With such a background, it is an extremely important task to meet demand for a fluidized bed apparatus capable of securing tens of gram-load as well as a superior laboratory-scale reactor.

Meanwhile, as a backdrop to preparation research, manufacturing costs of a few trillion yen per year are required to manufacture domestic top-level off-patent products, and this can be reduced by half by outsourcing. This accelerates commissioned processing. In addition, the revision of the Pharmaceutical Affairs Law permits succession of manufacturing approval, so that current commissioned products, may be manufactured by commissioned companies, and distributed by pharmaceutical companies. This makes it possible for the pharmaceutical companies to cope with enormous costs for development, and there is no doubt at the commissioned companies will take charge of preparation manufacturing in the future. In this background, it is an extremely important task to meet demand for tens of gram-load fluidized bed since it can reduce the costs for research and development and the screening time.

Patent Document 1: Japanese Published Unexamined Patent Application No. 2004-97852

Patent Document 2: Japanese Published Unexamined Patent Application No. 2004-122057

SUMMARY OF THE INVENTION

The present invention has been made in view of the circumstances described above, and it is a primary object of the present invention to provide a fluidized bed apparatus that effectively operates even with an infinitesimal loading amount in comparison with that of a conventional laboratory-scale reactor.

The present invention has been made in order to achieve the above-described object, and a first aspect of the invention is a fluidized bed apparatus including: a fluidizing container formed in an inverted truncated conical cylindrical shape; a porous plate provided so as to block a lower opening of the fluidizing container; an air supply means that jets out air into the fluidizing container via the porous plate; a cylindrical bag filter provided at an upper opening of the fluidizing container; an upper spray nozzle that sprays a spray liquid downward, arranged so as to be movable up and down inside the fluidizing container and the bag filter; a backwash nozzle that sweeps away powder particulates from the bag filter by jetting out air from the outside toward the inside of the bag filter; and a backwash nozzle elevator that moves the backwash nozzle up and down along the bag filter.

According to the first aspect of the invention, the inverted truncated conical cylindrical shaped fluidizing container is used, and into the fluidizing container, fluidizing air is jetted out upward from the lower porous plate, while spray liquid is sprayed downward from the upper spray nozzle. Therefore, even if a powder loading amount is so small as, for example, 10 to 50 g, the fluidized bed apparatus can effectively carry out granulation, coating or the like while fluidizing powder particulates in the fluidizing container. Here, the upper spray nozzle is movable up and down in a hollow space formed by the fluidizing container and the bag filter. Accordingly, the apparatus can adjust the extent of the spread of the sprayed liquid, thereby can flexibly respond to a change in the loading amount and the like. Also, the bag filter is provided with the backwash nozzle that moves up and down. Accordingly, the backwash nozzle sweeps away powder particulates adhered to the bag filter, so that an effective fluidization can be carried out even when the loading amount is small.

A second aspect of the invention is a fluidized bed apparatus including: a fluidizing container formed in an inverted truncated conical cylindrical shape; an inverted truncated conical cylindrical porous plate provided continuously from a circumferential side surface of the fluidizing container at a lower opening thereof; a lower spray nozzle that sprays spray liquid upward, provided at a lower opening of the porous plate; a cylindrical bag filter provided at an upper opening of the fluidizing container; a backwash nozzle that sweeps away powder particulates from the bag filter by jetting out air from the outside toward the inside of the bag filter; and a backwash nozzle elevator that moves the backwash nozzle up and down along the bag filter.

According to the second aspect of the invention, the inverted truncated conical cylindrical shaped fluidizing container is used, and the porous plate provided at the lower opening thereof is provided in an inverted truncated conical cylinder shape continuously from the circumferential side surface of the fluidizing container. And, the lower spray nozzle is provided at the lower opening of the roughly truncated conical porous plate, and the spray liquid is sprayed upward from the lower spray nozzle. Moreover, from the porous plate or from an upper spray nozzle provided above the fluidizing container, if desired, fluidizing air is jetted out. Therefore, even if a powder loading amount is so small as, for example, 1 to 10 g, the fluidized bed apparatus can effectively carry out granulation, coating or the like while fluidizing powder particulates in the fluidizing container. Furthermore, the bag filter is provided with a backwash nozzle that moves up and down. Accordingly, the backwash nozzle sweeps away powder particulates adhered to the bag filter, so that an effective fluidization can be carried out even when the loading amount is small.

A third aspect of the invention is the fluidized bed apparatus according to the second aspect further including: a roughly cylindrical draft tube arranged, inside between the fluidizing container and the porous plate, on the axis line that both of them are arranged on.

According to the third aspect of the invention, provision of the draft tube allows further smoothly carrying out fluidization of powder particulates. Therefore, even if the powder loading amount is so small as, for example, 0.5 to 5 g, the fluidized bed apparatus can effectively carry out granulation, coating or the like while fluidizing powder particulates in the fluidizing container.

A forth or fifth aspect of the invention is the fluidized bed apparatus according to the second or third aspect, wherein air is jetted out into the fluidizing container via an upper spray nozzle arranged so as to be movable up and down inside the fluidizing container and the bag filter and/or the porous plate.

According to a fourth or fifth aspect of the invention, the fluidized bed apparatus according to the second or third aspect is provided with an upper spray nozzle so as to be movable up and down, and fluidizing air is jetted out downward from the upper spray nozzle, or in place thereof or in addition thereto, fluidizing air is jetted out from the inverted truncated conical porous plate. When an upper spray nozzle is used, the upper spray nozzle is movable up and down in a hollow space formed by the fluidizing container and the bag filter. Accordingly, the apparatus can adjust fluidization of powder by the extent of the spread of the jetted air, thereby can flexibly respond to a change in the loading amount and the like.

A sixth to ninth aspect of the invention is respectively the fluidized bed apparatus according to any of the second to fifth aspects further including: an upper spray nozzle arranged so as to be movable up and down inside the fluidizing container and the bag filter, wherein a spray liquid is sprayed from the upper spray nozzle downward in place of spraying of a spray liquid by the lower spray nozzle.

According to the sixth to ninth aspects of the invention, the spray liquid is sprayed downward not from the lower spray nozzle but from the upper spray nozzle. And, the upper spray nozzle is movable up and down in a hollow space formed by the fluidizing container and the bag filter. Accordingly, the apparatus can adjust the extent of the spread of the sprayed liquid, thereby can flexibly respond to a change in the loading amount and the like. It is also possible to jet out only air from the lower spray nozzle and use the air for fluidization.

A tenth aspect of the invention is the fluidized bed apparatus according to the first, or the fifth, or the ninth aspect, further including: a vibrator that vibrates the fluidizing container.

According to the tenth aspect of the invention, vibrating the fluidizing container by the vibrator prevents powder from adhering to the inner wall of the fluidizing container and a bridging phenomenon, so that more effective fluidization can be carried out even when the loading amount is small.

An eleventh aspect of the invention is the fluidized bed apparatus according to any of the first to fifth aspects, wherein a lower container provided with the air supply means or the lower spray nozzle is formed in a manner attached to a lower end portion of the fluidizing container, and the lower container and the fluidizing container are detachably connected to a lower opening of the bag filter.

According to the eleventh aspect of the invention, the lower container and the fluidizing container can be attached and detached at will to and from the bag filter. Therefore, by replacing the lower container with the fluidizing container while employing a common basic configuration, the fluidized bed apparatus according to the first aspect, the fluidized bed apparatus according to the second aspect, and the fluidized bed apparatus according to the third aspect can be configured so that they can be replaced with one another.

A twelfth aspect of the invention is the fluidized bed apparatus according to the first aspect, wherein a powder loading amount is 10 to 50 g, a fluidizing air quantity is 12 to 40 L/min, and an air quantity of the upper spray nozzle is 6 to 12 L/min.

A thirteenth aspect of the invention is the fluidized bed apparatus according to the second aspect, wherein a powder loading amount is 1 to 10 g, a fluidizing air quantity is 1 to 6 L/min, and an air quantity of the spray nozzle that sprays the spray liquid is 6 to 12 L/min.

A fourteenth aspect of the invention is the fluidized bed apparatus according to the third aspect, wherein a powder loading amount is 0.5 to 5 g, a fluidizing air quantity is 1 to 6 L/min, and an air quantity of the spray nozzle that sprays the spray liquid is, 6 to 12 L/min.

According to the twelfth to fourteenth aspects of the invention, even with an infinitesimal loading amount in comparison with that in the conventional art, the fluidized bed apparatus can carry out granulation, coating or the like by fluidization.

Furthermore, a fifteenth aspect of the invention is the fluidized bed apparatus according to any of the first to ninth aspects, wherein the spray nozzle is formed with an insert and an outer case to house the same, the insert has a roughly columnar body portion of which front end portion is in a truncated conical shape, a liquid being passed through a liquid pipe extending to a front-end side along an axis of the body portion, a front end portion of the liquid pipe being formed in a truncated conical shape, and the outer case has an outer case body opened to a front-end side and a cap detachably provided at an opening of the outer case body, houses the insert while protruding a truncated conical portion of the liquid pipe outward from a front-end opening portion formed on the cap, and jets out a swirling air flow from a gap between the insert and itself at the front-end opening portion.

According to the fifteenth aspect of the invention, by forming the front end portion of the liquid pipe of the insert in a truncated conical shape, a spray nozzle that is capable of spraying with an infinitesimal quantity of liquid and air in comparison with that in the conventional art can be realized. At the front end portion of the liquid pipe, a roughly cylindrical portion may be provided in a manner further extending to the front end side from the truncated conical portion.

According to the present invention, a fluidized bed apparatus that effectively operates even with an infinitesimal loading amount as against that of a conventional laboratory-scale reactor can be provided.

DETAILED DESCRIPTION OF THE INVENTION

Hereinafter, a fluidized bed apparatus of the present invention will be described in greater detail based on the embodiments.

Embodiment 1

Figure 1:
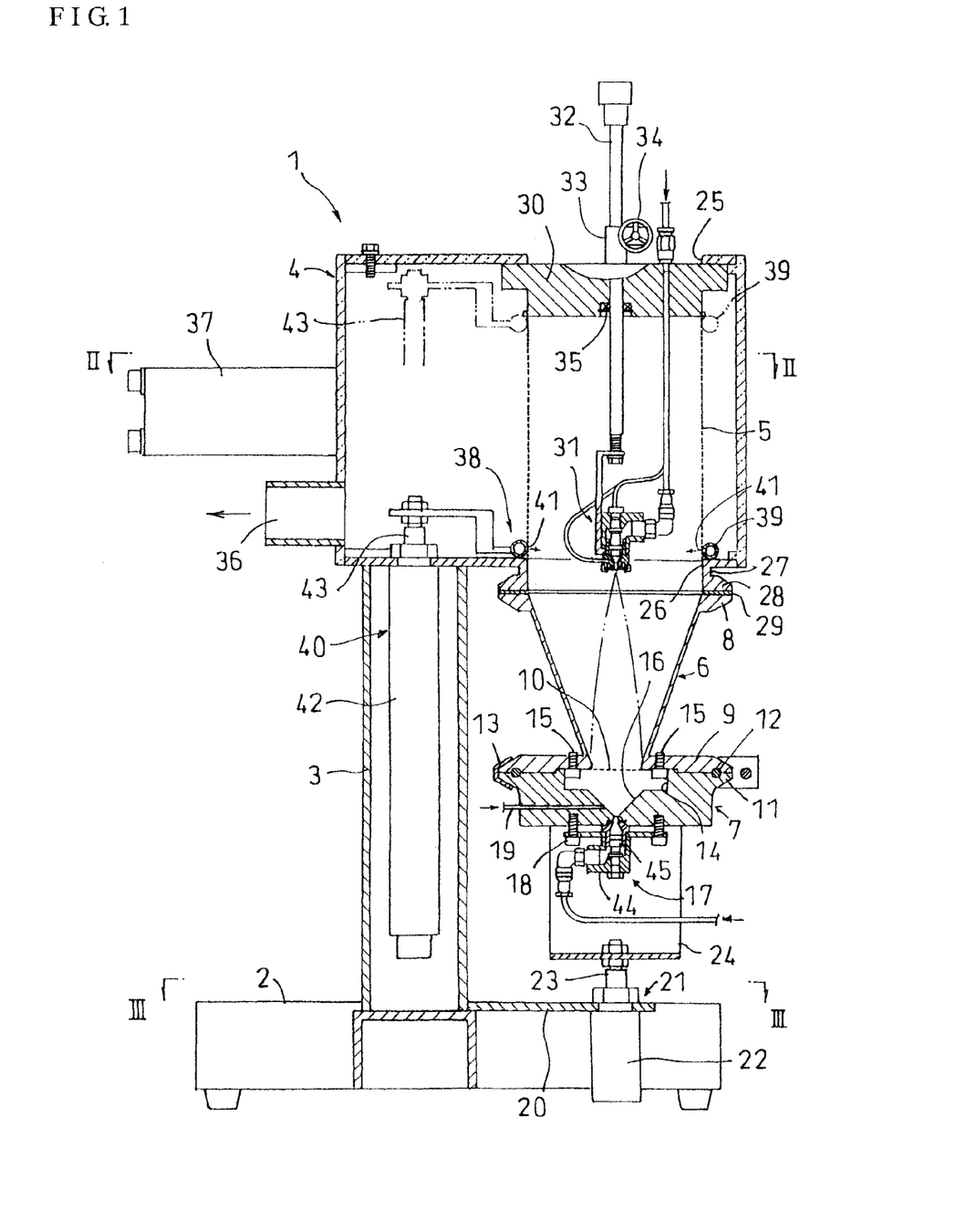
FIG. 1 is a schematic front longitudinal sectional view showing Embodiment 1 of a fluidized bed apparatus of the present invention.
Figure 2:
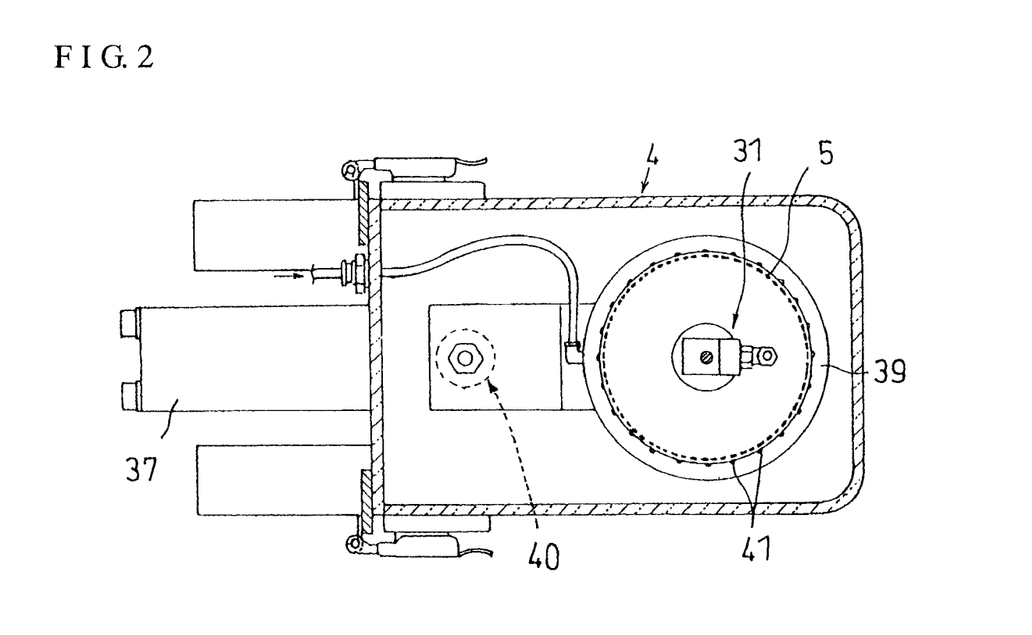
FIG. 2 is a sectional view along II-II of FIG. 1.
Figure 3:
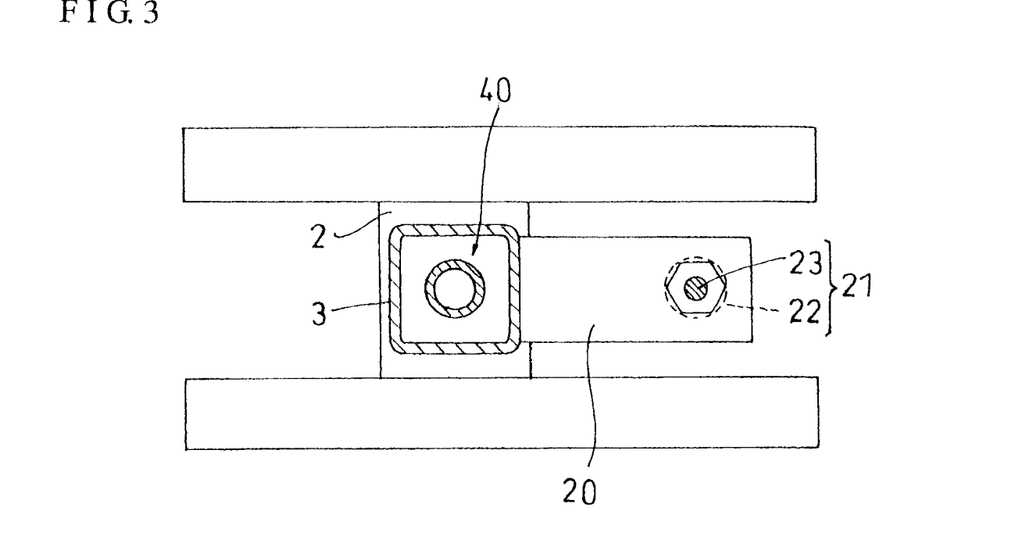
FIG. 3 is a sectional view along III-III of FIG. 1.

FIG. 1 to FIG. 3 are views showing Embodiment 1 of a fluidized bed apparatus of the present invention, wherein FIG. 1 is a schematic front longitudinal sectional view, FIG. 2 is a sectional view along II-II of FIG. 1, and FIG. 3 is a sectional view along III-III of FIG. 1. A fluidized bed apparatus 1 of the present embodiment includes, as a main portion, a horizontally held mount 2, a support 3 provided in a standing condition vertically upward from the mount 2, a roughly rectangular hollow box-like cover case 4 held at an upper end portion of the support 3, a bag filter 5 held in the cover case 4, a fluidizing container 6 provided at a lower portion of the bag filter 5, and a lower container 7 provided at a lower portion of the fluidizing container 6.

The fluidizing container 6 is formed in an inverted truncated conical cylindrical shape of which axis is vertically arranged, and is provided with flanges 8 and 9 at outer circumferential portions of both upper and lower ends, respectively. In addition, at a lower opening of the fluidizing container 6, a porous plate 10 is provided in a manner blocking the lower opening. In the present embodiment, two sheets of plain Dutch weave 24/200 mesh laid one on top of the other are used as the porous plate 10, however, this can be changed as appropriate without limitation.

The lower container 7 has a short columnar shape, and is provided with a flange 11 at an upper-end outer circumferential portion. A top surface of the lower container 7 is superimposed on a bottom surface of the lower flange 9 of the fluidizing container 9 via a sealant 12. The lower flange 9 of the fluidizing container 6 and the upper flange 11 of the lower container 7 are formed with an identical outside diameter, and are fixed in a superimposed condition on each other. Although this fixation may be provided by a bolt and nut, the flanges are connected by a ferrule clamp 13 in the present embodiment. Concretely, in the superimposed condition of the both flanges 9 and 11 on each other, an outer circumferential portion thereof is formed so as to taper off to the outside in the radial direction, and a roughly annular-shaped member is fitted along the outer circumferential portion, so that both open end portions thereof are clamped together, whereby the both flanges 9 and 11 are integrated.

In an upper center of the lower container 7, a circular hole 14 is formed in a depressed manner. The circular hole 14 is larger in diameter than the lower opening of the fluidizing container 6 and therefore houses the head of a bolt 15 that fixes the porous plate 10 to the lower flange 9 of the fluidizing container 6. At a center portion of the circular hole 14, an inverted conical hole 16 is formed in a manner further depressed downward. At a lower end portion of the inverted conical hole 16, a lower spray nozzle (however, this is used as a fluidizing air nozzle to supply only fluidizing air without supplying a spray liquid in the present embodiment) 17 is provided with its air jet port oriented upward.

More specifically, the lower spray nozzle 17 is held at a bottom-surface center portion of the lower container 7 by a bolt 18, and has the air jet port opened at the lower end portion of the inverted conical hole 16. However, the air supply means (fluidizing air port) provided for the lower container 7 is not limited to the lower spray nozzle 17 and may be formed by simply connecting an air supply channel. In addition, for the lower container 7, in place of the lower spray nozzle 17 or in addition thereto, a fluidizing air channel 19 may be provided in a manner opened into the inverted conical hole 16.

The lower container 7 to which the fluidizing container 6 has been connected is held by a support plate 20 horizontally extending from a lower portion of the support 3. On the support plate 20, a container elevator 21 is provided, and the container elevator 21 allows connecting the lower container 7 along with the fluidizing container 6, by pressing these against a lower end portion of the cover case 4, along with a lower end portion of the bag filter 5. The container elevator 21 is formed of an air cylinder in the present embodiment, and a rod 23 is advanceable and retractable up and down with respect to a cylindrical body 22. And, while the rod 23 is oriented upward, an upper portion of the cylindrical body 22 is fixed to the support plate 20. In addition, an upper end portion of the rod 23 is connected to a lower end portion of an auxiliary member 24 provided in a manner extending downward from the lower container 7. Due to such a configuration, the lower container 7 with the fluidizing container 6 can be attached and detached with respect to the lower portion of the bag filter 5 by advancing and retracting the rod 23 of the container elevator 21 up and down.

A unilateral end portion of the roughly rectangular hollow box-like cover case 4 is held at the upper end portion of the support 3. And, in a part thereof extending from the support 3, circular opening portions 25 and 26 are formed at both upper and lower end portions on the same axis line. The lower opening portion 26 has a cylindrical portion 27 formed while being slightly extending downward, and at a lower-end outer peripheral portion of the cylindrical portion 27, a flange 28 is formed. The cylindrical portion 27 (lower opening portion 26) has an inside diameter as large as that of an upper opening of the fluidizing container 6.

On a lower surface of the flange 28 of the cylindrical portion 27, as described above, the upper flange 8 of the fluidizing container 6 is superimposed by the container elevator 21. In the superimposed condition of these flanges 8 and 28 on each other, an outer circumferential portion thereof is formed so as to taper off to the outside in the radial direction. In addition, a sealant 29 is interposed between the flange 8 and 28. In this manner, the upper and lower opening portions 25 and 26 of the cover case 4 and the fluidizing container 6 and lower container 7 are arranged on the same axis line, respectively.

Continuously, from the upper opening of the fluidizing container 6 attached to the cover case 4 as such, the bag filter 5 is held in the cover case 4. The bag filter 5 of the present embodiment has a roughly cylindrical shape opened at the top and bottom, and a lower-end outer circumferential portion thereof is held at the cylindrical portion 27. The bag filter 5 is for separating fluidizing air and spray air from powder.

Moreover, at the upper opening portion 25 of the cover case 4, a lid 30 is held, and the lid 30 blocks the upper opening of the bag filter 5. The lid 30 of the present embodiment is transparent and also functions as an observation hatch to observe the inside of the bag filter 5 and fluidizing container 6. Moreover, in the present embodiment, the cover case 4 is transparent, so that the bag filter 5 and the like in the cover case 4 is visible from the outside.

In a hollow space formed by the bag filter 5 and the fluidizing container 6, an upper spray nozzle 31 is provided. The upper spray nozzle 31 is provided with its jet port (spray port) oriented downward and so that its height position is changeable. For this purpose, a slender round bar-like elevator shaft 32 is provided so as to be advanceable and retractable up and down through a center portion of the lid 30, and the upper spray nozzle 31 is held at a lower end portion of the elevator shaft 32. Concretely, the elevator shaft 32 is advanceable and retractable up and down through the lid 30 and a cylindrical body 33 provided on an upper surface thereof, and can be positioned and fixed to the lid 30 by operating a knob 34 provided on the cylindrical body 33. Moreover, a sealant 35 is provided between the lid 30 and a hole penetrating the same.

The upper spray nozzle 31 is supplied with spray liquid and air (spray air) and the like, and piping for these is provided airtightly through the lid 30. Moreover, at the lid 30, a slot to charge samples and the like into the fluidizing container 6 is provided, and furthermore, as requested, a thermometer and a differential pressure gauge are provided. A thermometer and a differential pressure gauge are further provided in the fluidizing container 6, in the lower container 7, and the like.

Moreover, in the cover case 4, an exhaust port 36 to exhaust air from the bag filter 5 outward is provided. Furthermore, in the cover case 4, a vibrator 37 to vibrate the fluidizing container 6 and the like is preferably provided. The direction and intensity of vibration of the vibrator 37 are appropriately set. The vibrator 37 may be attached to the support plate 20.

Furthermore, the fluidized bed apparatus 1 is provided with a backwash mechanism 38 to sweep away powder particulates adhered to the bag filter 5. More specifically, a backwash nozzle 39 is arranged around the bag filter 5, and the backwash nozzle 39 is moved up and down along the entire area of the bag filter 5 by a backwash nozzle elevator 40. Concretely, along the outer circumference of the bag filter 5, a ring-like pipe 39 forming the backwash nozzle is horizontally arranged, and a large number of air outlets 41 are perforated at equal intervals along the inner circumferential portion of the ring-like pipe 39. Accordingly, compressed air supplied to the inside of the ring-like pipe 39 is blown out of the air outlets 41 toward the bag filter 5. And, by moving the ring-like pipe 39 up and down along the bag filter 5, powder particulates adhered to the bag filter 5 can be swept away.

In order to move the ring-like pipe 39 up and down, the backwash nozzle elevator 40 is provided in the support 3. The backwash nozzle elevator 40 of the present embodiment is formed of an air cylinder, and a rod 43 is movable with respect to a cylindrical body 42. And, with the rod 43 oriented upward, the cylindrical body 42 is provided in the support 3. And, the ring-like pipe 39 is fixed to an upper end portion of the rod 43. By advancing and retracting the rod 43, the ring-like pipe 39 is reciprocated up and down between the lower end portion and upper end portion of the bag filter 5.

Figure 4:
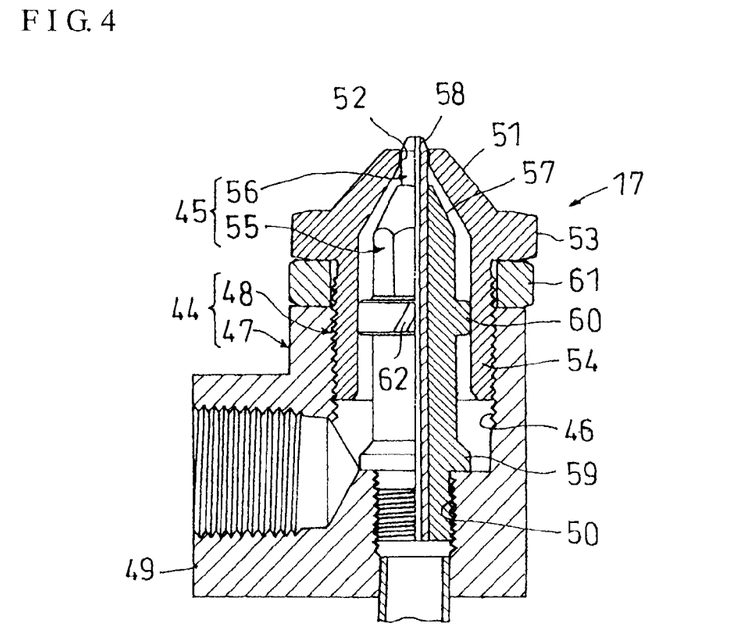
FIG. 4 is a schematic longitudinal sectional view showing a lower spray nozzle of Embodiment 1 in an enlarged manner.

FIG. 4 is a longitudinal sectional view showing the lower spray nozzle (fluidizing air nozzle) 17 of the present embodiment in an enlarged manner. As shown in this figure, the lower spray nozzle 17 of the present embodiment is formed by building an insert 45 into an outer case 44. The outer case 44 is composed of an outer case body 47 having a round hole 46 opened to a front-end side (upward) and a cap 48 to be detachably screwed into the round hole 46 of the outer case body 47.

Concretely, the outer case body 47 has a roughly columnar shape of which axis is vertically arranged, and has, at a circumferential side surface of its base-end side (lower), a branch pipe 49 to the outside in the radial direction. In the outer case body 47, a stepped round hole is formed in a manner opened to the top and bottom along the axis. At this time, a large-diameter hole 46 is arranged at the front-end side, and a small-diameter hole 50 is arranged at a base-end portion. A front-end portion of the large-diameter hole 46 and a front-end portion of the small-diameter hole 50 are provided as threaded holes, respectively. To a bottom end portion of the large-diameter hole 46, an inner hole of the branch pipe 49 is linked.

The cap 48 has a roughly cylindrical shape, and its front-end portion has a tapered roughly truncated conical shape. At a center portion of the truncated conical portion 51, a small-diameter hole (front-end opening portion) 52 is formed in a penetrating manner while being slightly extended in the axial direction. At a base-end portion of the truncated conical portion 51, a brim portion 53 is integrally formed in a manner extending to the outside in the radial direction. The outside diameter of the brim portion 53 is as large as the outside diameter of the outer case body 47. The outer circumferential surface of a cylindrical portion 54 is provided as a threaded portion, so that this can be screwed into the large-diameter hole 46 of the outer case body 47.

The insert 45 is provided by pressing a liquid pipe 56 made of a slender circular pipe along the axis of a round rod-like body portion 55 in a penetrating manner. The body portion 55 has a round rod-like form, and its front-end portion is formed so as to be tapered in a truncated conical shape. And, the liquid pipe 56 is provided so as to extend from the truncated conical portion 57 further to the front-end side. A front-end portion of the extended portion of the liquid pipe 56 is formed in a truncated conical portion 58.

At two midway positions of the body portion 55 of the insert 45, a base-end-side brim portion 59 and a front-end-side brim portion 60 are provided. The insert 45 is fixed by a threaded portion at the base-end side of its body portion 55 being screwed into the small-diameter hole 50 of the outer case body 47. At this time, the insert 45 is fixed by being screwed until the base end side brim portion 59 abuts against the bottom surface of the large-diameter hole 46 of the outer case body 47.

In this condition, the cylindrical portion 54 of the cap 48 is screwed into the large-diameter hole 46 of the outer case body 47. At this time, an annular collar 61 is arranged between the front-end face of the outer case body 47 and the brim portion 53 of the cap 48. In the condition where the cap 48 has been screwed and fixed into the outer case body 47 via the collar 61, the front-end portion 58 of the liquid pipe 56 is protruded from the front-end opening portion 52 of the cap 48. This is preferably arranged at a position where a base-end portion of the truncated conical portion 58 of the liquid pipe 56 is coincideded with the front-end face of the cap 48 or is slightly deviated therefrom. This adjustment is carried out by finely adjusting the thickness of the collar 61. In addition, the inside diameter of the front-end opening portion 52 of the cap 48 is slightly larger than the outside diameter of the liquid pipe 56.

In the condition where the cap 48 has been attached to the outer case body 47, the outer circumferential surface of the front-end-side brim portion 60 of the body portion 55 of the insert 45 is abutted against an inner hole of the cap 48. The front-end-side brim portion 60 has a short columnar shape, and on its outer circumferential surface, a plurality of inclined grooves 62 are formed while being inclined in an identical direction at equal intervals in the circumferential direction. The lower spray nozzle 17 having such a configuration can be supplied with a spray liquid from a base-end portion of the liquid pipe 56 and is supplied with air from the branch pipe 49 of the outer case body 47. However, in the present embodiment, without being supplied with a spray fluid, the lower spray nozzle 17 is used as a fluidizing air nozzle.

Now, to describe a case where the lower spray nozzle 17 is used for spraying a spray liquid, air supplied into the outer case body 44 is jetted out toward the front-end side through a gap between the insert 45 and outer circumferential surface. At this time, the air is made into a swirling flow by the action of the inclined groove 62 and is jetted out to the front-end side through a gap between the front-end opening portion 52 of the cap 48 and outer circumferential surface of the liquid pipe 56. In addition, the spray liquid supplied to the liquid pipe 56 is jetted out from the front-end portion of the liquid pipe 56. At this time, the spray liquid is atomized and sprayed by the action of the spray air made into the swirling flow described above. The spray nozzle having such a configuration allows spraying with an infinitesimal quantity of liquid and air.

Figure 5:
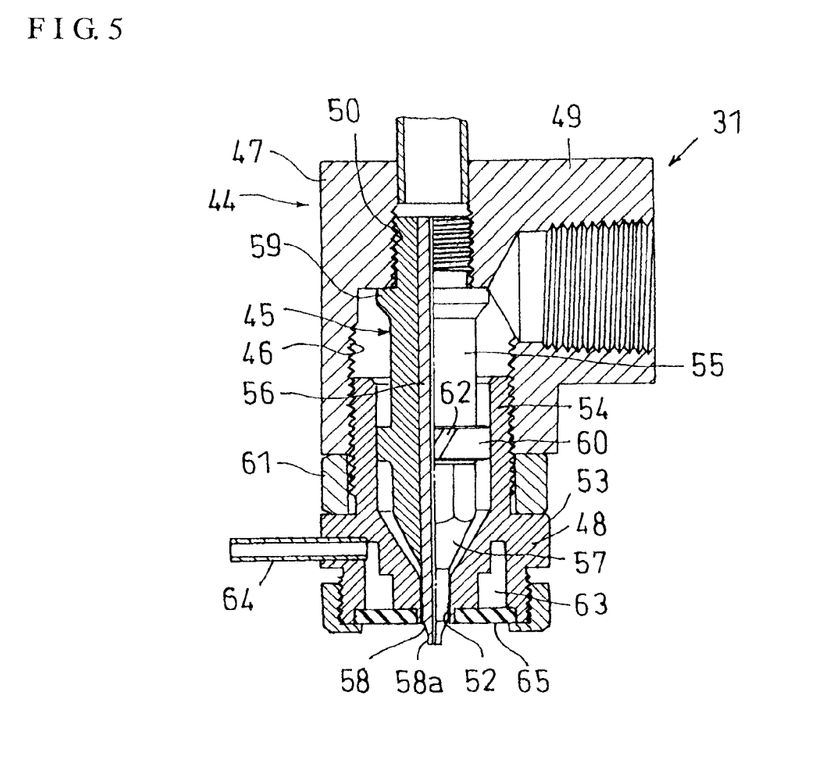
FIG. 5 is a schematic longitudinal sectional view showing an upper spray nozzle of Embodiment 1 in an enlarged manner.

FIG. 5 is a longitudinal sectional view showing the upper spray nozzle 31 of the present embodiment in an enlarged manner. The upper spray nozzle 31 has basically an identical configuration to that of the lower spray nozzle 17. Therefore, description will hereinafter be given mainly of a difference therebetween, while corresponding parts will be denoted with identical reference numerals in the description. However, the upper spray nozzle 31 is used with inverted upside down relative to the lower spray nozzle 17.

The upper spray nozzle 31 is different from the lower spray nozzle 17 in the structure of the front-end portion of the cap 48. More specifically, the front-end portion of the upper spray nozzle 31 is formed in a roughly columnar shape, and at its front-end face, formed is a ring-shaped space 63 opened to the front-end side so as to surround the front-end portion of the liquid pipe 56. And, the ring-shaped space 63 is supplied with air from an air supply pipe 64 in a circumferential side surface, and the air is jetted out toward a front-end opening portion of the ring-shaped space 63. At the front-end opening portion of the ring-shaped space 63, in order to close the same, an annular-shaped and plate-like elastic member 65 is held at only its outer circumferential portion. Accordingly, by intermittently supplying spray adhesion preventive air from the air supply pipe 64, an inner circumferential portion of the elastic member 65 can be moved so as to prevent a spray liquid from adhering to the front-end portion of the liquid pipe 56. This provides with consistently smooth spray of the spray liquid. Moreover, for the upper spray nozzle 31, a smaller-diameter short cylindrical portion 58a is formed at a front-end portion of the truncated conical portion 58 in the front-end portion of the liquid pipe 56.

Next, use of the fluidized bed apparatus 1 in the present embodiment 1 will be described. In use, powder particulates (various samples) are housed in the hollow space formed by the bag filter 5 and the fluidizing container 6. And, from the lower spray nozzle 17, air heated by a heater is made to flow in, while a spray liquid is sprayed from the upper spray nozzle 31. In addition, by actuation of the backwash nozzle 39 and its elevator 40, operation can be carried out while preventing the powder particulates from adhering to the bag filter 5.

A fluidizing range of the powder particulates includes the fluidizing container 6 and the bag filter 5 above the porous plate 10. Although not particularly limited, in the present embodiment, the lower-end inside diameter of the fluidizing container 6 and the diameter of the porous plate 10 is 28.5 mm, the inside diameter of the upper end of the fluidizing container 6 and the bag filter 5 is 100 mm, the height of the fluidizing container 6 is 100 mm, and the height of the bag filter 5 is 160 mm.

Fifteen grams of powder particulates or coating core particles were loaded, 20 L/min of fluidizing air from the porous plate 10 was made to flow in, and the upper spray nozzle 31 was operated with a liquid quantity of 0.5 g/min and an air quantity of 9 L/min, whereby granulated granules or coated substances with sustained-release films formed were obtained.

When the loading amount was 15 g, fluidization did not occur with a single-sheet porous plate, but fluidization occurred with a double-sheet porous plate. A pressure loss of the porous plate 10 necessary for fluidization was 0.1 kPa. A porous plate aeration rate to obtain an appropriate fluidization was 15 L/min (0.4 m/s) to 22 L/min (0.6 m/s). When an air quantity for the upper spray nozzle 31 was 12 L/min or more, the powder particulates to be fluidized upward from the porous plate 10 were remarkably hindered in fluidization by the opposing spray nozzle air, and the powder particulates that were being fluidized in a liquid spray area were extremely reduced, therefore, the spray liquid directly adhered to the inner wall of the fluidizing container 6 and the porous plate 10, so that granulation or coating was impossible.

With highly adhesive and cohesive powder particulates (mixture powder of lactose 200 mesh and cornstarch at a ratio of 7 to 3), the powder particulates adhered to the inner wall of the fluidizing container 6 and bag filter 5 and fluid particles disappeared immediately after fluidizing air flowed in. This adhesion was prevented by activating the vibrator 37 intermittently on a 0.5-second run and 2-second halt basis. Sweeping of the bag filter 5 was carried out with an air quantity of 12 L/min, at an elevating speed of the ring-like pipe 39 of 4 sec/cycle, when the mixture powder of lactose and cornstarch was used.

In terms of the fluidized bed apparatus 1 of Embodiment 1, it was confirmed that effective fluidization was carried out in a range of the powder loading amount of 10 to 50 g, the fluidizing air quantity of 12 to 40 L/min, and the air quantity of the upper spray nozzle 31 of 6 to 12 L/min.

Embodiment 2

Figure 6:
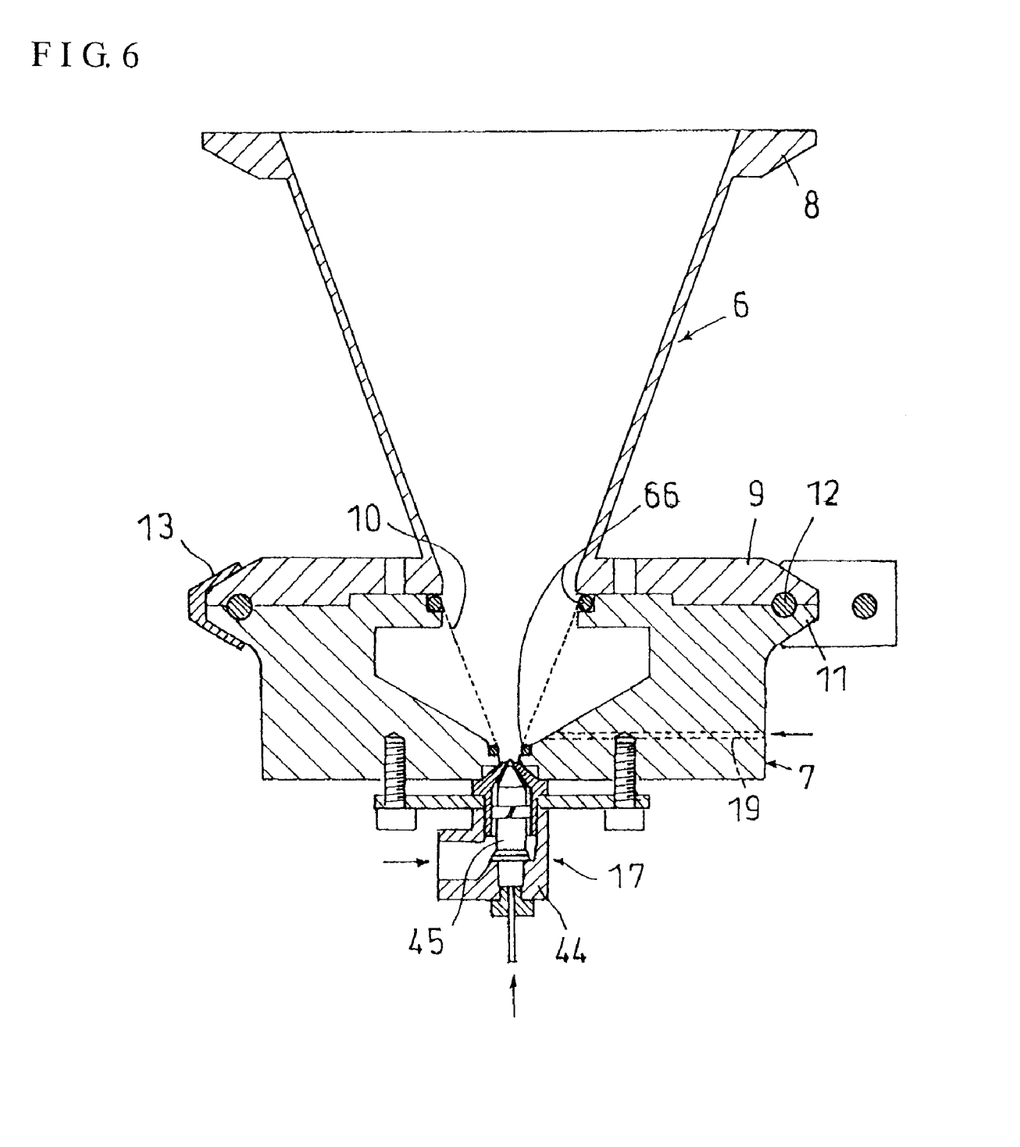
FIG. 6 is a schematic sectional view showing Embodiment 2 of a fluidized bed apparatus of the present invention, showing only a part of a fluidizing container and a lower container.

FIG. 6 is a schematic longitudinal sectional view showing Embodiment 2 of a fluidized bed apparatus 1 of the present invention, showing only a part of a fluidizing container 6 and a lower container 7. The fluidized bed apparatus 1 of the present embodiment 2 has almost the same configuration as that in the aforementioned embodiment 1. Therefore, description will hereinafter be given mainly of a difference therebetween, while corresponding parts will be denoted with identical reference numerals in the description.

The fluidized bed apparatus 1 of the present embodiment 2 is different from the aforementioned embodiment 1 in the configuration of the fluidizing container 6 and lower container 7 shown in FIG. 6. Accordingly, for the fluidized bed apparatus 1 of the present embodiment 2, in the fluidized bed apparatus 1 of the aforementioned embodiment 1 shown in FIG. 1, the lower container 7 with the fluidizing container 6 is replaced by that shown in FIG. 6. This replacement can be easily carried out by an up-down motion of the container elevator 21.

The present embodiment 2 is different from the aforementioned embodiment 1 in the configuration of the porous plate 10. More specifically, in the present embodiment 2 as well, the fluidizing container 6 formed in an inverted truncated conical cylindrical shape is provided, however, continuously from a circumferential side surface of the fluidizing container 6, at its lower opening, an inverted truncated conical cylindrical shaped porous plate 10 is provided. And, the lower spray nozzle 17 is provided at a lower opening of the porous plate 10 and sprays a spray liquid upward. In this case, the upper spray nozzle 31 is not used, or removed, or made to jet out only air for use. However, only air may be jetted out from the lower spray nozzle 17, and in such a case, it is sufficient to spray a spray liquid from the upper spray nozzle 31. Moreover, in the present embodiment 2, the lower container 7 makes it possible to supply fluidizing air not only from the lower spray nozzle 17 but also from an outer circumferential portion of the porous plate 10 into the fluidizing container 6 via the fluidizing air channel 19.

From the lower container 7, air heated by a heater is made to flow in for use. The porous plate 10 has an inverted truncated conical shape opened at the both top and bottom as described above, of which the upper and lower ends are sealed by O-rings 66 and a sheet of plain Dutch weave 24/200 wire mesh or a sheet of 60/400 wire mesh is used. And, this is mounted on the lower container 7, so that fluidizing air flows in from a side surface of the lower container 7. The lower container 7 and the fluidizing container 6 are, as in Embodiment 1, connected by the ferrule clamp 13. Other aspects of configuration are the same as those in Embodiment 1.

A fluidizing range of the powder particulates includes the inverted truncated conical porous plate 10 of the lower container 7, the fluidizing container 6, and the bag filter 5. The inside diameters of the lower end and upper end of the porous plate 10 are 4 mm and 28.5 mm, respectively, the inside diameters of the lower end and upper end of the fluidizing container 6 are 28.5 mm and 100 mm, respectively, the inside diameter of the bag filter 5 is 100 mm, the height of the porous plate 10 is 35 mm, the height of the fluidizing container 6 is 100 mm, and the height of the bag filter 5 is 160 mm. However, as a matter of course, these dimensions are mere examples, and can be changed as appropriate.

When 1 g of powder particulates or coating core particles were loaded, 4 L/min of fluidizing air from the porous plate 10 was made to flow in, the lower spray nozzle 17 was operated with a liquid quantity of 0.05 g/min and an air quantity of 9 L/min, and the upper spray nozzle 31 was not used, granulated granules or coated substances with sustained-release films formed were obtained.

In addition, 1 g of coating core particles were loaded, an air quantity of 9 L/min was jetted out from the upper spray nozzle 31 without using fluidizing air from the porous plate 10, and the lower spray nozzle 17 was operated with a liquid quantity of 0.05 g/min and an air quantity of 9 L/min, whereby coated substances with sustained-release films formed were obtained. Simultaneously using an air jet from the upper spray nozzle 31 as such was effective, as a result of preventing the coating core particles from crushing due to an excessive fluidization and keeping the rising range of the fluidized coating core particles low by opposing air, for reducing void space between fluid particles in a sprayed area of the spray liquid and thereby improving the yield of coating.

Powder particulates (mixture powder of lactose 200 mesh and cornstarch at a ratio of 7 to 3) or coating core particles were used at a loading amount of 1 g. Without air inflow from the porous plate 10, the powder particulates adhered to the inner wall of the fluidizing container 6 and bag filter 5 immediately after fluidizing air flowed in and fluid particles disappeared when the quantity of air from the lower spray nozzle 17 was large. When the quantity of air from the lower spray nozzle 17 was small, fluidization did not occur due to a rat hole phenomenon, in that air blows through the center portion of a powder bed, and use of the vibrator 37 caused a stronger bridging, thus being counterproductive. For obtaining an appropriate fluidization, the vibrator 37 was simultaneously used in intermittent actuation on a 0.5-second run and 2-second halt basis, and the aeration rate of the inverted truncated conical porous plate 10 was 2 L/min to 4 L/min. Sweeping of the bag filter 5 was carried out with an air quantity of 12 L/min and an elevating speed of the ring-like pipe 39 of 4 sec/cycle.

In terms of the fluidized bed apparatus of Embodiment 2, it was confirmed that effective fluidization is carried out in a range of the powder loading amount of 1 to 10 g, the fluidizing air quantity of 1 to 6 L/min, and the air quantity of the spray nozzle that sprays the spray liquid of 6 to 12 L/min.

Embodiment 3

Figure 7:
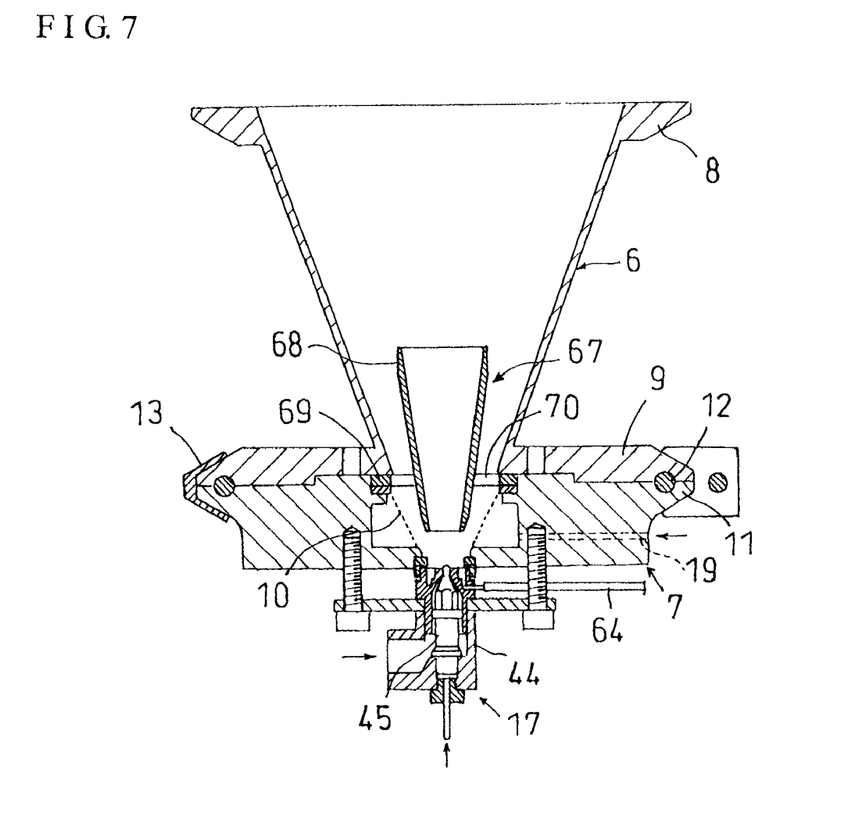
FIG. 7 is a schematic sectional view showing Embodiment 3 of a fluidized bed apparatus of the present invention, showing only a part of a fluidizing container and a lower container.

FIG. 7 is a schematic longitudinal sectional view showing Embodiment 3 of a fluidized bed apparatus 1 of the present invention, showing only a part of a fluidizing container 6 and a lower container 7. The fluidized bed apparatus 1 of the present embodiment 3 has almost the same configuration as that in the aforementioned embodiment 1 and embodiment 2. Therefore, description will hereinafter be given mainly of a difference therebetween, while corresponding parts will be denoted with identical reference numerals in the description.

The fluidized bed apparatus 1 of the present embodiment 3 is different from the aforementioned embodiment 1 in the configuration of the fluidizing container 6 and lower container 7 shown in FIG. 7. Accordingly, for the fluidized bed apparatus 1 of the present embodiment 3, in the fluidized bed apparatus 1 of the aforementioned embodiment 1, the lower container 7 with the fluidizing container 6 is replaced by that shown in FIG. 7. This replacement can be easily carried out by an up-down motion of the container elevator 21.

Figure 8:
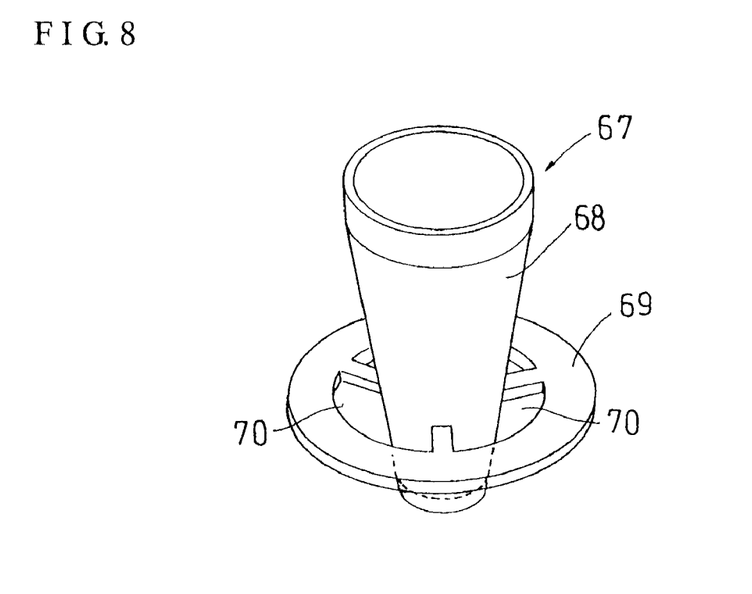
FIG. 8 is a schematic perspective view showing a draft tube of Embodiment 3.

It can be said that the configuration of FIG. 7 is a modification of the configuration in FIG. 6. More specifically, this is equivalent to one in which a draft tube 67 is installed in the aforementioned embodiment 2 and the lower spray nozzle 17 is changed in the configuration. FIG. 8 is a schematic perspective view showing the draft tube 67 of Embodiment 3. The draft tube 67 of the present embodiment 3 is composed of an inverted truncated conical cylindrical body 68, and is installed by sandwiching, between the fluidizing container 6 and lower container 7, a disk 69 provided at an outer circumferential portion located slightly above a lower end portion of the cylindrical body 68. In the installed condition, at a position corresponding to the lower opening of the fluidizing container 6, a plurality of openings 70 are arranged along the circumferential direction, so that the fluidizing container 6 and the lower container 7 are linked almost throughout the area.

Figure 9:
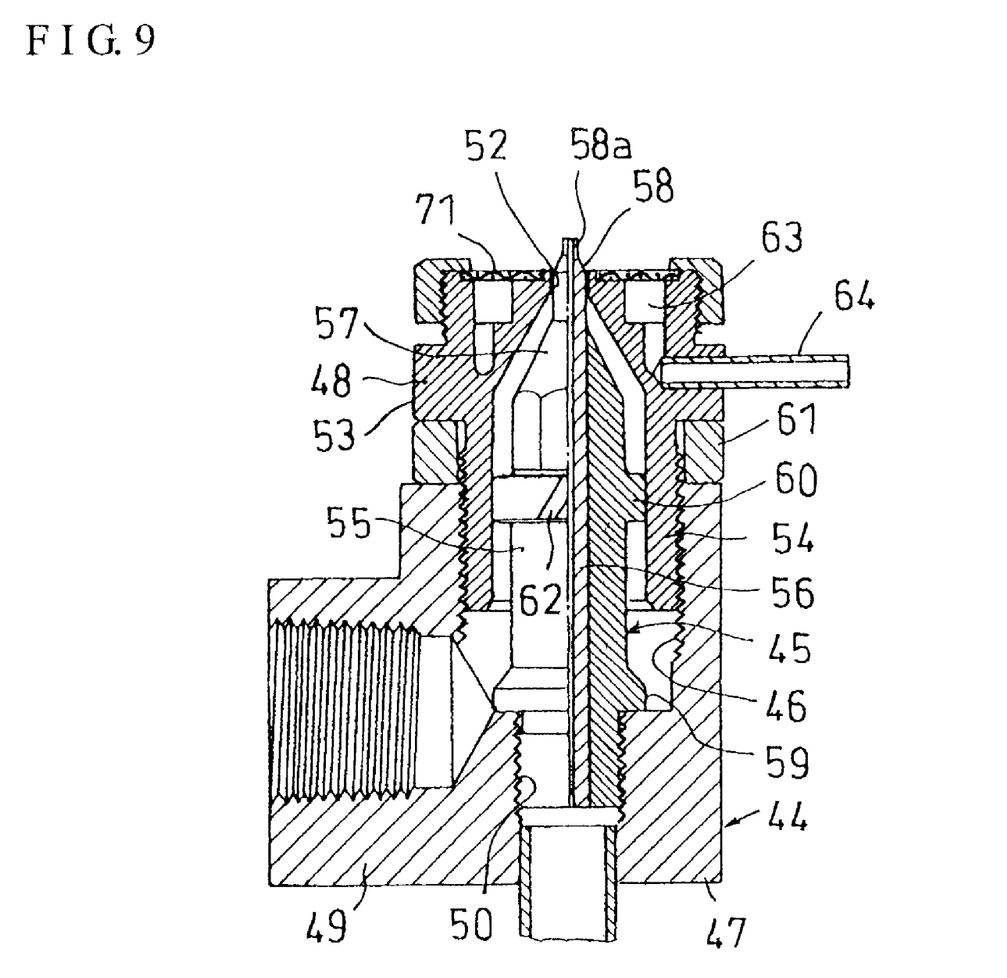
FIG. 9 is an enlarged longitudinal sectional view showing a lower spray nozzle of Embodiment 3.

FIG. 9 is an enlarged longitudinal sectional view showing the lower spray nozzle 17 of Embodiment 3. The lower spray nozzle 17 is a modification of the upper spray nozzle 31 of the aforementioned embodiment 1, wherein the elastic member 65 is changed to a wire mesh 71. However, the wire mesh 71 is fixed at its both inner and outer circumferential portions to the front-end face of the cap 48. Then, the fluidized bed apparatus 1 of the present embodiment 3 is used in the same manner as in the aforementioned embodiment 2.

The porous plate 10 of the present embodiment 3 has an inverted truncated conical shape opened at the both top and bottom as described above, of which the upper end is sealed by a packing, the lower end is sealed by an O-ring, and a sheet of plain Dutch weave 24/200 wire mesh or a sheet of 60/400 wire mesh is used. And, this is mounted on the lower container 7, so that fluidizing air flows in from a side surface of the lower container 7.

A fluidizing range of the powder particulates includes the inverted truncated conical porous plate 10 of the lower container 7, the draft tube 67 (cylindrical body 68), the fluidizing container 6, and the bag filter 5. The inside diameters of the lower end and upper end of the porous plate 10 are 9.5 mm and 28.5 mm, respectively, the inside diameters of the lower end and upper end of the draft tube 67 are 8 mm and 22 mm, respectively, the inside diameters of the lower end and upper end of the fluidizing container 6 are 28.5 mm and 100 mm, respectively, the inside diameter of the bag filter 5 is 100 mm, the height of the porous plate 10 is 24.5 mm, the height of the draft tube 67 is 50 mm, the height of the fluidizing container 6 is 100 mm, and the height of the bag filter 5 is 160 mm.

However, as a matter of course, these dimensions are mere examples, and can be changed as appropriate.

When 0.5 g of powder particulates or coating core particles were loaded, 4 L/min of fluidizing air from the porous plate 10 was made to flow in, the lower spray nozzle 17 was operated with a liquid quantity of 0.05 g/min and an air quantity of 9 L/min, and the upper spray nozzle 31 was not used, granulated granules or coated substances with sustained-release films formed were obtained.

In addition, 0.5 g of coating core particles were loaded, fluidizing air from the porous plate 10 was made to flow in, an auxiliary air quantity of 1 L/min was jetted out from the periphery (air supply pipe 64) of the lower spray nozzle 17, and the lower spray nozzle 17 was operated at a liquid rate of 0.03 g/min and an air quantity of 9 L/min, whereby coated substances with sustained-release films formed on microparticles of 100 μm or less were obtained. Air jetting of the lower spray nozzle 17 through the wire mesh 71 was effective in increasing void space between fluid particles in an area in which the spray liquid spread and thereby preventing cohesion due to an excessive wetting of the small-diameter coating core particles.

With highly adhesive and cohesive powder particulates, the vibrator 37 was actuated intermittently on a 0.5-second run and 2-second halt basis, so that adhesion to the draft tube 67 and the inner wall of the fluidizing container 6 was prevented. Sweeping of the bag filter 5 was carried out with an air quantity of 12 L/min and an elevating speed of the ring-like pipe 39 of 4 sec/cycle.

In terms of the fluidized bed apparatus 1 of Embodiment 3, it was confirmed that effective fluidization is carried out in a range of the powder loading amount of 0.5 to 5 g, the fluidizing air quantity of 1 to 6 L/min, and the air quantity of the spray nozzle that sprays the spray liquid of 6 to 12 L/min.

As in the above, according to the respective embodiments of the fluidized bed apparatus of the present invention, the following operational advantages are provided.

1. Inclusion of the bag filter in the powder fluidizing area realized an extremely compact apparatus. The mechanism for sweeping away powder by blowing out air from the ring-like pipe provided with a large number of pressure air outlets in the outer circumference of the bag filter toward the bag filter and by moving the pipe up and down eliminated unstable fluidization due to intermittent stop of fluidization in a shaking method or a large quantity of air backflow used in a pulsed air backwash method. Even against the phenomenon in that powder fluidization is hindered as the opposing air quantities contend with each other, such as an air quantity of porous plate aeration of 20 L/min and an air quantity of the upper spray nozzle of 12 L/min, the fluidizing container was vibrated by simultaneously using a vibrator, whereby a smooth fluidization was obtained.

2. When a loading amount of 1 g is intended, fluidization cannot occur with such a flat porous plate as shown in Embodiment 1 since airflow blows therethrough due to the loading amount. A countermeasure thereagainst can be taken by the spouted fluidized bed shown in Embodiment 2. However, adhesion and cohesion by static electricity and a rat hole phenomenon occurred with most powder samples. When the quantity of air from the lower spray nozzle was large, the powder adhered to the inner wall of the fluidizing container and bag filter immediately after fluidizing air flowed in and fluid particles disappeared. When the quantity of air from the lower spray nozzle was small, fluidization did not occur due to a rat hole phenomenon, in that air blows through the center portion of a powder bed. Consequently, an intermediate range where a smooth fluidization can be carried out did not exist therebetween. Fluidization at a loading amount of 1 g was possible only by simultaneous use of the spouted fluidized bed and air inflow from the vibrator and inverted truncated porous plate.

In addition, with the coating core particles free from adhesion and a rat hole, simultaneously using an air jet from the upper spray nozzle was effective, as a result of preventing the coating core particles from crushing due to an excessive fluidization and keeping the rising range of the fluidized coating core particles low by opposing air, for reducing void space between fluid particles in an area in which the spray liquid spread and thereby improving the yield of coating.

3. In terms of the fluidized bed with a draft tube of Embodiment 3, retention of powder at the lower end of the draft tube is well known, and countermeasures as in the aforementioned patent documents have been taken. When a minute quantity of powder as in the present invention is loaded, a significant retention of powder occurs as a result of an extremely narrow powder circulation path attributable to a reduction in size. As a countermeasure thereagainst, making fluidizing air flow in by forming the outer circumference in the vicinity of the lower end of the draft tube as the inverted truncated conical porous plate and air jetting from the periphery of the spray nozzle were extremely effective.

The fluidized bed apparatus of the present invention can be changed as appropriate without limitation to the configurations of the aforementioned respective embodiments. For example, to a bottom portion of the lower container, an air hole may be simply connected in place of a spray nozzle that makes air heated by a heater flow in. In addition, the fluidizing container and the bag filter may be connected by a ferrule clamp in place of automatically connecting by a lifting cylinder. Furthermore, for the bag filter, as preventive measures against explosion by static electricity, a corona discharge cloth, and a filter with a ground wire may be used.

In addition, for the sweeping of the bag filter, a method of mechanically vibrating the bag filter up and down with the upper end closed, the lower end opened, and fluidizing air stopped can also be employed. In addition, a method of shocking the bag filter by making compressed air intermittently flow in from the upper end of the bag filter with the upper end opened, the lower end closed, and fluidizing air not stopped can also be employed. However, in the fluidized bed apparatus with spray nozzles that handle a small quantity of liquid and air as in the present invention, an intermittent fluidization stop in the former and an instantaneous fluidization stop due to high-pressure air inflow in the latter caused an increase in adhesion and cohesion and hindered an appropriate spraying, and thus is not preferable.

Furthermore, the fact that the bag filter was directly connected to the inverted truncated conical fluidizing container so as to form a part of the fluidizing container and had such a configuration as separating fluidizing air and powder, while circulating the powder in an area of which the spray liquid spread allowed effectively granulating and coating a minute amount of powder and thereby improving the yield.

In addition, incidental equipment included a compressed air supply, a single-phase 100 V power supply, an electric heater to heat compressed air, a general-purpose tubing pump, a silicon tube having an inside diameter of 0.5 mm or 1.0 mm and an outside diameter of 3.0 mm, and operating panels to run and measure the instruments described in the aforementioned respective embodiments, and no special device was used therein. As the powder samples, lactose 200 mesh, cornstarch, 100 to 850 μm various types of coating core particles, hydroxypropylcellulose HPC-L, and an acrylic dispersion L-30D were used.

What is claimed is:
1. A fluidized bed apparatus comprising:
   a fluidizing container formed in an inverted truncated conical cylindrical shape;
   a porous plate provided so as to block a lower opening of the fluidizing container;
   an air supply means that jets out air into the fluidizing container via the porous plate;
   a cylindrical bag filter provided at an upper opening of the fluidizing container;
   an upper spray nozzle that sprays spray liquid downward, arranged so as to be movable up and down inside the fluidizing container and the cylindrical bag filter;
   a backwash nozzle that sweeps away powder particulates from the cylindrical bag filter by jetting out air from the outside toward the inside of the cylindrical bag filter; and
   a backwash nozzle elevator that moves the backwash nozzle up and down along the cylindrical bag filter.

2. The fluidized bed apparatus according to claim 1, wherein
   a powder loading amount is 10 to 50 g, a fluidizing air quantity is 12 to 40 L/min, and an air quantity of the upper spray nozzle is 6 to 12 L/min.

3. A fluidized bed apparatus comprising:
   a fluidizing container formed in an inverted truncated conical cylindrical shape;
   an inverted truncated conical cylindrical porous plate provided continuously from a circumferential side surface of the fluidizing container at a lower opening thereof;
   a lower spray nozzle that sprays a spray liquid upward, provided at a lower opening of the porous plate;
   a cylindrical bag filter provided at an upper opening of the fluidizing container;
   a backwash nozzle that sweeps away powder particulates from the cylindrical bag filter by jetting out air from the outside toward the inside of the cylindrical bag filter; and
   a backwash nozzle elevator that moves the backwash nozzle up and down along the cylindrical bag filter.

4. The fluidized bed apparatus according to claim 3 further comprising:
   a roughly cylindrical draft tube arranged, inside between the fluidizing container and the inverted truncated conical cylindrical porous plate, on the same axis line that they are arranged on.

5. The fluidized bed apparatus according to claim 4, wherein
   air is jetted out into the fluidizing container via an upper spray nozzle arranged so as to be movable up and down inside the fluidizing container and the cylindrical bag filter and/or the porous plate.

6. The fluidized bed apparatus according to claims 5, wherein
   spray liquid is sprayed from the upper spray nozzle downward in place of spraying of spray liquid by the lower spray nozzle.

7. The fluidized bed apparatus according to claim 1, or 5, or 6 further comprising:
   a vibrator that vibrates the fluidizing container.

8. The fluidized bed apparatus according to any of claims 1 to 5, wherein
   a lower container provided with the air supply means or the lower spray nozzle is formed in a manner attached to a lower end portion of the fluidizing container, and the lower container and the fluidizing container are detachably connected to a lower opening of the cylindrical bag filter.

9. The fluidized bed apparatus according to claims 4 further comprising:
an upper spray nozzle arranged so as to be movable up and down inside the fluidizing container and the cylindrical bag filter, wherein
spray liquid is sprayed from the upper spray nozzle downward in place of spraying of spray liquid by the lower spray nozzle.

10. The fluidized bed apparatus according to claim 3, wherein
air is jetted out into the fluidizing container via an upper spray nozzle arranged so as to be movable up and down inside the fluidizing container and the cylindrical bag filter and/or the porous plate.

11. The fluidized bed apparatus according to claims 10, wherein
spray liquid is sprayed from the upper spray nozzle downward in place of spraying of spray liquid by the lower spray nozzle.

12. The fluidized bed apparatus according to claims 3 further comprising:
an upper spray nozzle arranged so as to be movable up and down inside the fluidizing container and the cylindrical bag filter, wherein
spray liquid is sprayed from the upper spray nozzle downward in place of spraying of spray liquid by the lower spray nozzle.

13. The fluidized bed apparatus according to claim 3, wherein
a powder loading amount is 1 to 10 g, a fluidizing air quantity is 1 to 6 L/min, and an air quantity of a spray nozzle that sprays the spray liquid is 6 to 12 L/min.

14. The fluidized bed apparatus according to claim 4, wherein
a powder loading amount is 0.5 to 5 g, a fluidizing air quantity is 1 to 6 L/min, and an air quantity of a spray nozzle that sprays the spray liquid is 6 to 12 L/min.

15. The fluidized bed apparatus according to any of claims 1 to 6, wherein
the upper or lower spray nozzle is formed with an insert and an outer case to house the same,
the insert has a roughly columnar body portion of which front end portion is in a truncated conical shape, a liquid being passed through a liquid pipe extending to a front-end side along an axis of the body portion, a front end portion of the liquid pipe being formed in a truncated conical shape, and
the outer case has an outer case body opened to a front-end side and a cap detachably provided at an opening of the outer case body, houses the insert while protruding a truncated conical portion of the liquid pipe outward from a front-end opening portion formed on the cap, and jets out a swirling air flow from a gap between the insert and itself at the front-end opening portion.

* * * * *

UNITED STATES PATENT AND TRADEMARK OFFICE
CERTIFICATE OF CORRECTION

PATENT NO. : 7,654,222 B2
APPLICATION NO. : 11/609974
DATED : February 2, 2010
INVENTOR(S) : Osako et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 690 days.

Signed and Sealed this

Twenty-third Day of November, 2010

David J. Kappos
*Director of the United States Patent and Trademark Office*